(12) United States Patent
Maas et al.

(10) Patent No.: US 10,874,971 B2
(45) Date of Patent: Dec. 29, 2020

(54) OPERATING AND CHANGE APPARATUS FOR FILTER BODIES; FILTER BODIES AND PROCEDURE FOR FILTER CHANGE AS WELL AS A CONVEYOR WITH FILTERS

(71) Applicant: Volkmann GmbH, Soest (DE)

(72) Inventors: Joachim Maas, Welver (DE); Christopher Tegelkamp, Soest (DE)

(73) Assignee: Volkmann GmbH

( * ) Notice: Subject to any disclaimer, the term of this patent is extended or adjusted under 35 U.S.C. 154(b) by 620 days.

(21) Appl. No.: 15/491,328

(22) Filed: Apr. 19, 2017

(65) Prior Publication Data
US 2017/0296960 A1  Oct. 19, 2017

(30) Foreign Application Priority Data

Apr. 19, 2016 (DE) .................... 20 2016 002 433 U

(51) Int. Cl.
*B01D 53/02* (2006.01)
*B01D 46/42* (2006.01)
(Continued)

(52) U.S. Cl.
CPC ..... *B01D 46/4227* (2013.01); *B01D 46/0002* (2013.01); *B01D 46/0005* (2013.01); *B01D 46/008* (2013.01); *B01D 46/2411* (2013.01)

(58) Field of Classification Search
CPC ............ B01D 46/0002; B01D 46/0005; B01D 46/008; B01D 46/2411; B01D 46/4227
See application file for complete search history.

(56) References Cited

U.S. PATENT DOCUMENTS

| | | | | |
|---|---|---|---|---|
| 4,198,221 A | * | 4/1980 | Catlin ................. | B01D 46/008 55/481 |
| 5,131,931 A | * | 7/1992 | Miley ................. | B01D 46/008 55/481 |
| 6,364,923 B1 | * | 4/2002 | Wiedmeyer ......... | B01D 46/008 454/187 |

FOREIGN PATENT DOCUMENTS

| | | |
|---|---|---|
| DE | 2755964 A1 | 6/1979 |
| DE | 102006061814 B4 | 12/2010 |

OTHER PUBLICATIONS

German Search Report for corresponding DE 20 2016 002 433.8 dated Nov. 9, 2016, 8 pgs.

(Continued)

*Primary Examiner* — Christopher P Jones
(74) *Attorney, Agent, or Firm* — Rankin Hill & Clark LLP

(57) ABSTRACT

An operating and changing apparatus for a filter body located at a filter position that displays a filter body axis of symmetry located at a filter position and in which a particle filter is integrated in order to remove particles from a particle-laden fluid. The filter body has a fluid-permeable filter body opening and a fluid-impermeable filter body wall section. The apparatus has a housing that the fluid can flow through with a flow channel in which the filter body is so positioned that the fluid can flow through the particle filter. The flow channel has a flow inlet and a flow outlet such that the fluid flow between flow inlet and outlet runs through the particle filter of the filter body. The flow channel has a channel axis which runs parallel/collinear with the filter body's axis. The flow inlet and outlet are offset to each other, relative to the channel symmetric axis. The flow channel and the housing have a filter insertion opening and a filter disposal opening that are in alignment along the channel axis. A change of the particle filter takes place through (Continued)

exchange of the filter body with an exchange filter body with a replacement filter whereby the replacement filter body can be pushed through the filter insertion opening into the flow channel and the filter body to be replaced can be pushed out of the filter disposal opening by the pushing-in of the replacement filter body. During the pushing of the filter body, the flow inlet and outlet are blocked fluidically by the impermeable filter body wall segment until the replacement filter body has reached the original filter position such that the flow channel is not open during the change and the change is accomplished almost entirely without interrupting the flow.

11 Claims, 6 Drawing Sheets

(51) Int. Cl.
      *B01D 46/24*      (2006.01)
      *B01D 46/00*      (2006.01)

(56) References Cited

OTHER PUBLICATIONS

Espacenet Bibliographic data:DE102006061814 (B4), Published Dec. 30, 2010, 2pgs.
Espacenet Bibliographic data for:FR2411023 (A1), Published Jul. 6, 1979, 2pgs. This is a corresponding document for DE2755964 (A1), Published Jun. 13, 1979 as DE2755964 was not available.

* cited by examiner

OPERATING AND CHANGE APPARATUS FOR FILTER BODIES; FILTER BODIES AND PROCEDURE FOR FILTER CHANGE AS WELL AS A CONVEYOR WITH FILTERS

FIELD OF THE INVENTION

The invention involves an operating and changing apparatus for a filter body with a particle filter, one with features according to the features of the preamble of claim 1 and another with features according to the features of the preamble of claim 2. The filter body is located inside the operating and changing apparatus at an intended and operational filter position. The filter body preferably comprises a filter body axis of symmetry. (Filter body) Axis of symmetry is herein a reference or direction giving line or point set, that for example—but not necessarily—at least in sections may have features of a geometric axis. At least one particle filter designed to remove particles from a particle-laden fluid is integrated into the filter body. The particle filter can be a HEPA filter (HEPA: High Efficiency Particulate Arrestance, analogous to: high-performance particle separation), for example a class 14 HEPA filter. Alternatively an EPA filter can be provided or a ULPA-filter (EPA: Efficient Particulate Air; ULPA: Ultra Low Particulate Air). The fluid stream can be constituted as a compressed air stream (with pressures above ambient pressure) or as a suction current (at pressures below ambient pressure). The particles can be dusts, for example. The filter body exhibits at least one fluid-permeable filter body opening (for example, on the front and/or in a jacket segment) and at least one fluid-impermeable filter body wall segment (for example on the front of an adjacent jacket segment.

The operating and changing apparatus includes a housing (containment) that is permeable to the fluid and impermeable to other fluids with a flow channel. The flow channel can be respectively limited by the housing or be positioned in the housing with its own channel restriction. The channel can exhibit an angular, rectangular, (right-)angled, a round or an oval profile. The filter body can be so positioned in the flow channel that the particle filter is permeable to the fluid. Several (especially when running in parallel) flow channels can also be positioned in the housing. The filter body's profile conforms for the most part to the profile of the channel so that the filter body fits into the channel in such a way that between filter body and the inner wall of the channel there is either no gap or just a small gap.

In the housing, the flow channel is equipped with at least one flow inlet for the inflow of the particle-laden fluid and with at least one flow outlet for the outflow of the particle-free fluid in such a way that the fluid flow between flow inlet and flow outlet in the flow channel passes through the filter body's particle filter. With a conceivable reversal of the flow direction, the fluid flows in through the flow outlet and out through the flow inlet.

It can also be provided that two filter bodies are positioned in the channel, one behind the other as a double filter. Customarily, one of the two filters serves as a backup in case the other fails. The filter bodies exhibit a common dimension and/or filter body axis of symmetry in the longitudinal direction. By "longitudinal direction" is meant for the most part the longitudinal axis of the containment, along which the flow can pass, at least in sections. A particle filter has been integrated into every filter body. In addition, the operating and changing apparatus includes a housing that the fluid can flow through with a flow channel in which a first filter body with a first particle filter and a second filter body, preferably structurally identical to the first with a second particle filter, preferably identical to the first, can be arranged in such a way that, for example, initially the first particle filter and/or the second particle filter can be permeated by the fluid. Between the flow inlet and the flow outlet, the fluid can flow in the flow channel through the first particle filter of the first filter body and (from there) through the second particle filter of the second filter body. If the filter change shall be performed with filters that are not structural identical, the exchange filter may be longer or shorter or lightweight or more stable than the filter that is to be exchanged. If the involved filters are not identical by changing the filters the filter class can be changed as well, e.g. HEPA class 14 changing into HEPA class 12 or vice versa. The parcel filter of the exchange filter e.g. could comprise a higher or lower filter class than the filter class of the filter of the filter body that is to be exchanged.

The construction can exhibit a housing with at least two housing sections, whereby every housing section includes the features described above. The flow channel appropriate to the first housing section can be switched to be fluidically in series or in parallel with the flow channel of the second housing section.

The invention also concerns a filter body with a particle filter or consisting of a particle filter, to remove particles from a particle-laden fluid with the features according to the features of the preamble of claim 8 or according to the features of the preamble of claim 9.

The invention also involves a procedure to change a particle filter inserted in a fluid flow while maintaining (almost) constant flow.

Finally, the invention pertains to a conveyor to convey a product by means of fluid flow in a conveying channel. Accordingly, the fluid stream flows through a filtering device with at least one filter body.

BACKGROUND OF THE INVENTION

For the transport or conveyance of products containing dust by means of a transport fluid, specifically a gaseous one, the expense connected to the cleaning/filtering of the transport fluid is often problematic. The invention has undertaken the task of reducing the expense of cleaning/filtering a fluid.

SUMMARY OF THE INVENTION

The cleaning of the fluid is regularly performed with EPA, HEPA or ULPA filters which however have to be replaced periodically. The expense related to the filter replacement can be significantly reduced with an operating and changing apparatus for a filter body in accordance with claim 1, whereby the total expense connected to the cleaning/filtering of the fluid is reduced. Configurations of the invention arise from the sub-claims.

The flow channel preferably comprises a channel symmetry axis that runs parallel and in fact, collinear to the filter body symmetry axis. The channel symmetry axis is—according to the filter body axis of symmetry—is herein a reference or direction giving line or point set, that for example—but not necessarily—at least in sections may have features of a geometric axis. For example and with respect to the channel symmetry axis the flow inlet and flow outlet of the flow channel are arranged offset from one another and/or with a distance to each other. If a cylinder geometry is provided or a containment form similar to a cylinder, an (only) radial offset between the flow inlet and the flow outlet can be established, so that flow inlet and flow outlet are arranged vis-à-vis.

The flow channel and in particular, the flow channel and the housing contain a filter insertion opening and a filter disposal opening. Through the filter disposal opening the filter (body) is removable from the apparatus, e.g. by falling out, pushing out, pulling out or generally moving out. Next to the filter disposal opening or filter removing opening a reservoir for waste filters can be arranged, e.g. as a tube, or chamber or bag, wherein the (waste) filters at least temporary can be stored (intermediately). The filter insertion opening and the filter disposal opening can be arranged, e.g. along the channel symmetrical axis, in a geometric alignment. A change of the particle filter takes place through exchange of the filter body for a replacement filter body with a replacement filter. The replacement filter body thereby slides through the insertion opening into the flow channel. The filter body to be replaced is thereby pushed out of the channel through the disposal opening by the insertion of the replacement filter body. During the pushing in and pressing out of the filter body, the flow inlet and/or the flow outlet are blocked fluidically by the fluid-tight filter body wall section until the replacement filter body has reached the filter position so that during the exchange of particle filters, the flow channel is not opened and so that the change of the particle filter takes place almost without interrupting the flow.

For the filter body positioned appropriately for operation in the housing, the filter body opening or rather the filter body openings are located in the flow channel between flow inlet and flow outlet. For the filter body being pushed or sliding during filter change, at least one filter body wall segment will be found between flow inlet and flow outlet as a result of which the flow channel is tightly closed fluidically. Preferably, at least during filter pushing, a filter body wall segment will be found providing a seal before the flow inlet and a further filter body wall segment will be found providing a seal before the flow outlet.

The flow channel forms a certain kind of sluice gate during filter change. The duration of the air standstill within the channel and during the change of filter is less than 10 seconds and in particular, shorter than about ¹/₁₀ second. The flow channel, or rather the housing, can incorporate several flow inlets as well as several flow outlets. For example, three flow openings can be anticipated: two on the inlet side as well as one on the (opposite) outlet side or one on the inlet side along with two on the outlet side.

The expense associated with the filter change can be further reduced with an operating and changing apparatus with several filters/filter bodies in accordance with claim 2. According to this, the flow channel preferably displays a channel symmetrical axis that runs parallel to and in fact, collinear with the filter body's axis of symmetry. Relative to the channel symmetrical axis, the flow inlet and flow outlet are arranged offset from one another or with a distance between each other. The flow channel, in particular the flow channel and the housing, incorporate a filter insertion opening and a filter disposal opening, whereby, preferably, the filter insertion opening and the filter disposal opening are arranged along the channel symmetrical axis in geometrical alignment, for example on the front of the housing. If the ground view of the housing comprises a bend or curve, the filter bodies are arranged behind another. A particle filter change takes place through the insertion of a replacement filter body with a replacement filter into the flow channel. The replacement filter body can be pushed through the insertion opening in the channel. The first filter body can be shifted through the pushing in of the replacement filter body to the original position of the second filter body. By shifting the first filter body, the second filter body can also be shifted with the particle by the replacing particle filter. Through the insertion of the replacement filter body and the shifting of the first filter body, the second filter body with the replacement particle filter can be pressed out of the channel through the disposal opening. The first filter body takes the place of the second filter body in the flow channel after the change of filters. At least during the insertion/pressing out of the filter body, the flow inlet and/or the flow outlet will be blocked fluidically by the fluid-tight filter body wall segment long enough for the second filter body to assume the position of the first filter body and the replacement filter body has assumed the original filter position of the second filter body so that during the change of particle filters, the flow channel is not opened so that the replacement of the particle filters has taken place almost completely without interrupting the flow. For this filter (body) arrangement, more than two and for example, three, four, five or more linearly aligned filter bodes in the flow channel can be foreseen. Always the first and the last filter body in the row of filter bodies participate in the filter change: the last will be pushed out by the one pushing behind it and the first becomes the second, the second becomes the third, etc.

Depending on the configuration, it is possible to foresee that between the flow channel and the filter body or the filter bodies, one or more sealing portions, especially seals, can be applied. The flow inlet or rather the flow inlets and the flow outlet or rather the flow outlets are dependent on the flow direction or rather dependent on the direction of symmetry offset to one another. Through the misalignment, a lock or a narrowing of the openings either on the inlet side, the outlet side or both sides—especially through one or more filter bodies is achieved when the filter bodies are shifted. An interruption of flow, or rather a standstill of the air, will then be especially effectively avoided if, during the shifting of the filter body, the flow passes solely through that particular filter that remains in the channel during the entire filter change (for example, the first filter). During the change and upon sliding the filter, the filter remaining (first filter) in the channel takes over the filtering function of the apparatus by itself for a brief period. When shifting the filter body, at least one flow inlet and/or at least one flow outlet will be blocked fluidically by the first and/or the second filter body. In addition, depending on the symmetry axis and/or depending on the direction of flow, a spatial misalignment of at least one inlet relative to at least one outlet can be advisable. The breadth of the misalignment can be determined from the geometry of the filter body being used. For example, the flow opening on the outflow side in the area of the filter insertion opening or in the area of the filter disposal opening can be arranged while the flow opening on the inflow side can be arranged essentially to be centered or almost centered between filter insertion and filter disposal openings.

To package the removed filter body, a stockpile of tubing arranged on the outside of the housing in the area of the filter disposal opening can be provided. The packaging is appropriate to the extent that the filter being removed is enriched in most cases of switching with particles from the fluid and is in that sense "full". Since the particles regularly form a health risk (dusts in the pharmaceutical industry contain substances; dusts in industry consist at least in part of noxious fine dust particles), the expense of the filter change will be significantly reduced by the packaging of the filter/filter body immediately after the change. To do this, the filter body with the removed filter is to be immediately placed in a section of tubing which can be derived from a tubing stockpile attached to the housing. The tubing stockpile is wrapped around a side-mounted part of the housing which turns the housing into a tubing dispenser.

Preferred on the tubing stockpile or rather on a section of the housing is the placement of a tube-like film which forms a special tubing stockpile. The section of tubing wrapped around the removed filter body can be sealed with the filter body inside with, for example, a clamp, with string or by (heat-)sealing.

So that the content of the containment is better protected between two filter change procedures, through which the filter durability and thus the cost of switching can be reduced, at least one locking device to close the filter insertion opening and/or the filter disposal opening should be provided. The apparatus can include a tube sealing provision with which the tube from the tubing stockpile can be sealed and in particular, sealed and detached.

The operating and changing apparatus defined by this invention can at least include a safety device. As a result of this safety device, operating errors during operation of the operating and changing apparatus are to be avoided. A possible operating error would be, for example, the pulling (out) of a filter (the first filter) instead of the pushing through of the filter or rather the filters as described above. Such an operating error could accompany the opening of the flow channel or rather the containment which can lead to contamination of the channel and/or the surroundings of the change apparatus as well as the overload/damage of the devices connected to the apparatus. In order to prevent this, for example, a charging device (outside) on the housing is being planned in which the intended (replacement) filter body is deployable and which at the minimum supports the insertion of the filter body and insures the exact positioning of the (replacement) filter body in the housing. The charging device can at least include a guide such as a track for the filter body with which the (replacement) filter body can be pushed into the housing. Twisting or slanting the filter bodies when pushing them in would thereby be avoided which leads to the further advantage that the operator cannot get the bright idea to execute the filter change some way other than what is prescribed. Alternatively, or in addition, a barrier to movement in the housing can be anticipated that permits movement of the filter body in an initial (intentional) direction and prevents movement of the filter body in the opposite direction (wrong direction). To do this, a special spring-force driven hook or flap mechanism in the housing of the operating and changing apparatus is foreseen that closes upon movement of the body and permits the movement of the filter body in the proper direction and blocks the filter body in the open condition if the filter body gets moved in the direction opposite to the proper one.

The expense connected with a filter change can be reduced with a filter body with a particle filter for removing particles from a particle-laden fluid in accordance with claim 8. Thus, the filter body exhibits a filter body geometry that is suited for using the filter body in the operating and changing apparatus described here. The preferred method is for the filter body to have the customary mostly cylindrical geometry, i.e. the fronts of the filter body are round (or circular). Alternatively, a cuboid geometry can be foreseen so that the front is rectangular or square. The profile could also be triangular, if desired, so that the filter body would take on the geometry of a prism. The reference line described herein as "symmetry axis" could run through a characteristic point as the (geometric) center of gravity of a cross section plane, and preferably essentially parallel to the direction of linear extension of the body.

The expense connected with a filter change can be reduced alternatively or additionally with a filter body with a particle filter for removing particles from a particle-laden fluid in accordance with claim 9. The filter body/the particle filter comprises at least a sealing portion, especially a seal. The sealing portion or the seal can be provided with a portion/section of the particle filter or by a portion/section of the filter body. The sealing portion or the seal provide a fluidically sealing between the channel and the hosing. The filter can be provided as one member that comprises the features of the particle filter and the sealing character with respect to the filter housing. In this case the particle filter would not have only (dust) filtering characteristics but also (fluidically) sealing function within the housing.

The cost connected with the filter change can be further reduced by a procedure described in claim 9. The procedure achieves a change of a particle filter inserted in a fluid flow while maintaining almost constant flow. The particle filter is positioned in a filter body and the filter body is positioned in a flow channel traversed by the fluid. To change the filter, a replacement filter body with a replacement filter is pushed through a filter insertion opening into the channel. As a result of the pushing in of the replacement filter body into the flow channel, the filter body to be replaced is pushed out of the flow channel through a filter disposal opening. During the sliding of the filter body to be replaced, the flow channel is closed through a fluid-tight wall section of the filter body so that the flow channel or rather, the containment is not opened as a result of the filter change.

The expense connected with the filter change can be further reduced with the procedure described in claim 11. An initial particle filter will be positioned in an initial filter body and the initial filter will be positioned in turn in a flow channel being traversed by a fluid together with at least one additional, second filter body with a second particle filter; these filter bodies are arranged either behind one another or beside one another. To change filters, a replacement filter body with a replacement filter will be pushed into the channel via a filter insertion opening. As a result of the pushing in of the replacement filter body into the flow channel, the initial filter body and the second filter body to replace it will be slid into the flow channel in the direction of a filter disposal opening. Through this sliding, the second filter body will be pushed out of the channel through the filter disposal opening.

Preferably, the filter body that was pushed out will be packed into a tube of film whereby the film tubing can be taken from a special endless film tubing supply. In this context, "endless" means a tubing stockpile that will provide a number (about 50, or better yet, 200 or more) of tube sections before the tubing stockpile is exhausted. Thus, a tube segment has a length that is about twice the length of a filter body, possibly also only 1.5 times that of this length. After packaging the pushed-out filter, the film tube can be sealed particularly tightly and preferably be detached after sealing.

The cost connected with filter change can be further reduced with a conveyor in accordance with claim 14 or claim 16. The conveyor serves to advance a product by means of fluid flow in a conveyor tunnel where the fluid passes through a filtering device with at least one filter body. The conveyor includes an operating and changing apparatus as described here for one filter body, as particularly described here. One filter can be changed in the conveyor specified by the invention through a filter change procedure described here.

The above-named construction components as well as those to be used as described in the implementation examples are not subject to any special exceptions as to their size, shape, materials of construction and technical design so that whatever the field of application, familiar selection criteria can be applied without exception.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF PREFERRED EMBODIMENTS

Figure 1:
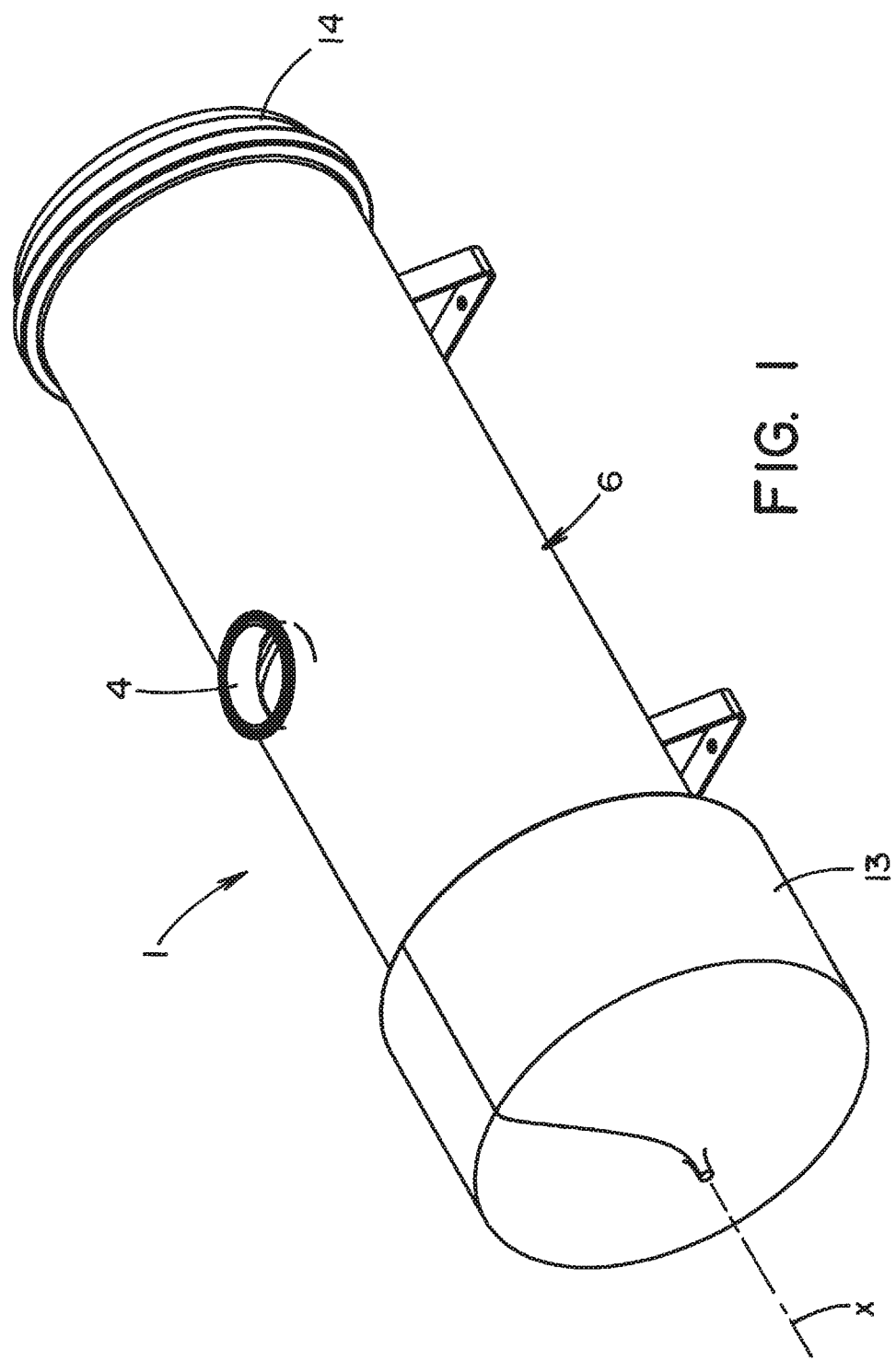
FIG. 1 shows a filter operating and changing apparatus in perspective.

Referring now to the drawings wherein the showings are for the purpose of illustrating preferred and alternative embodiments of the invention only and not for the purpose of limiting the same, FIG. 1 shows a perspective view of an operating and changing apparatus 1 for (HEPA) filter 2. The filter 2 can be an EPA, HEPA or ULPA filter. A fluid such as a gaseous suction flow, flows through the apparatus 1. Alternatively, a stream of gas at positive pressure can be fed through the apparatus 1. The fluid will be represented as a suction current below. FIG. 1 shows the housing 6 of apparatus 1. The housing 6 forms a channel 8, through which the suction current can be fed.

The gaseous suction current can advance products or product particles in a conveyor not shown here. The apparatus 1 can be connected to a conveyor, for example in the area where the suction current is created or where the suction current is conditioned. The suction current flows through the filter operating and changing apparatus 1, whereby the suction current is cleaned of (dust) particles by HEPA filters 2, that are positioned inside the apparatus 1.

Figure 2:
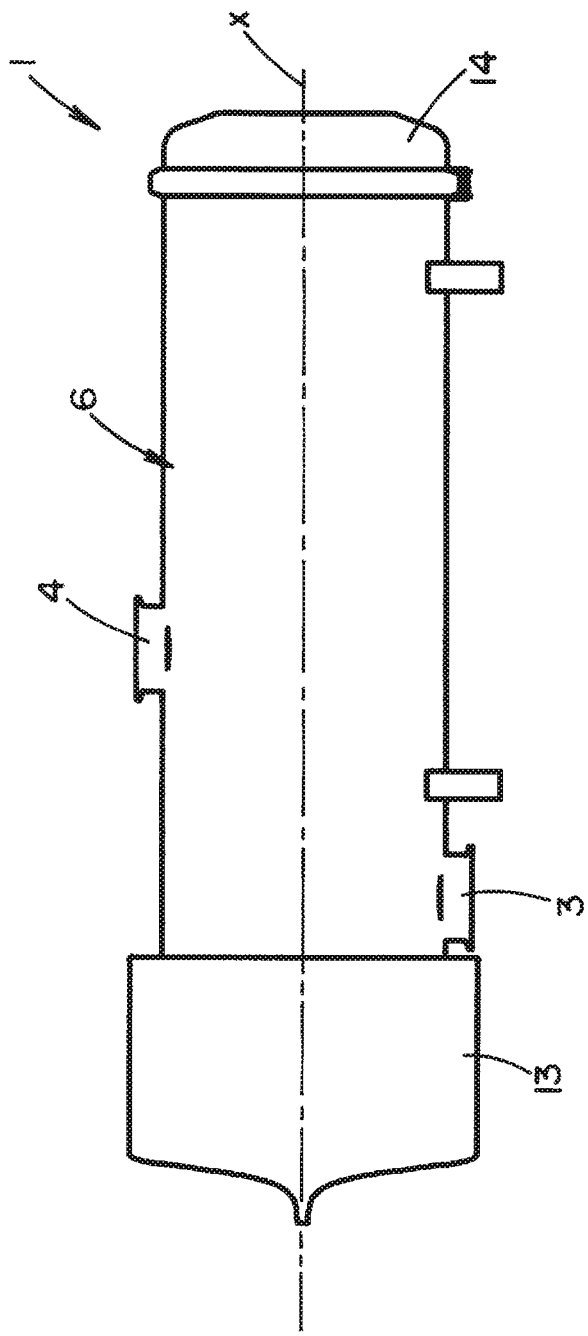
FIG. 2 shows an operating and changing apparatus in side view.

A side view of the apparatus 1 can be obtained in FIG. 2 where flow inlet 3 und flow outlet 4 can be identified. Flow inlet 3 and flow outlet 4 each include a flange for connecting openings 3 and 4 with (not shown) pipes or channels to channel the suction current. In accordance with FIG. 2, the inlet side of apparatus 1 is positioned on top, the outlet side is positioned on the underside 5 of apparatus 1. Fasteners are also found on the underside to fasten apparatus 1 to a base or to a pump housing.

FIGS. 3 to 6 provide lateral sectional views of the apparatus 1 consistent with FIGS. 1 and 2. FIGS. 3 to 6 each show two HEPA filters 2, 2' positioned next to one another. The filters 2, 2' are in each case positioned in one filter body 7, 7'. Filter 2 und filter 2' are identical, as are filter body 7 and filter body 7'. The filter bodies 7, 7' with the filters 2, 2' are positioned in an alignment, one behind the other, oriented on the axis of symmetry, x (see also FIG. 2) of the housing 6 of the apparatus 1. The filter bodies 7, 7' are positioned next to one another as related to the flow direction.

The filter bodies 7, 7' are located in a channel 8 that is formed through the housing 6. Channel 8 and filter bodies 7, 7' have almost the same profile so that the filter bodies 7, 7' can be positioned in the channel 8 and sealed up. The suction current travels accordingly only through HEPA filters 2, 2' and not around the filter material and not around the filter bodies 7, 7'. The current is represented in FIG. 3 by arrows.

The current flows through the flow inlet 3 into the particle filter 2' of the filter body 7'. From there, the current proceeds across a filter body opening on the front of the filter body 7' in the area between filter body 7 and filter body 7'. The current then proceeds to flow outlet 4. If now filter body 7 and thereby also filter body 7' are pushed (in FIG. 3 toward the left), flow outlet 4 and flow inlet 3 will be closed impermeably through wall sections of the filter body 7'. This means that by sliding—in other words, during exchanging of the filter body 7, 7'—the flow channel in the housing 6 of the apparatus will not be opened. The particle-bearing stream of fluid does not accordingly enter, while filter body change is taking place, i.e. while the housing is open on the end, the environment where the exchange is taking place. In addition, no or nearly no ambient air enters the flow channel while a filter change is being carried out.

Figure 3:
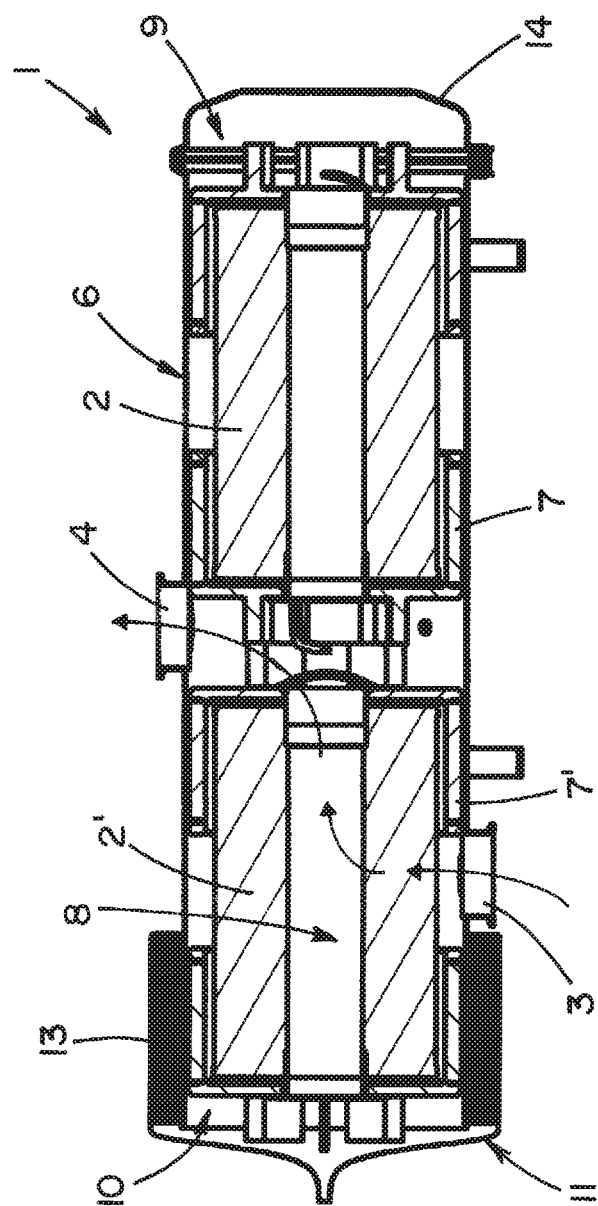
FIGS. 3 to 6 show sectional views of an apparatus like that in FIG. 2, in each case under varying operating conditions.

The current symbolized in FIG. 3 can also flow in the opposite direction, i.e. from flow outlet 4 through filter 2' to the flow inlet 3. A bypass can also be provided so that during the filter change, the first filter (filter 2) positioned ("parked") in the housing will be flowed through briefly via the bypass until it then sits in the intended position caused by the filter change. The bypass can be positioned partially in the housing and/or partially outside the housing. The bypass can encompass at least one of the housing's flow openings as its own.

Figure 4:
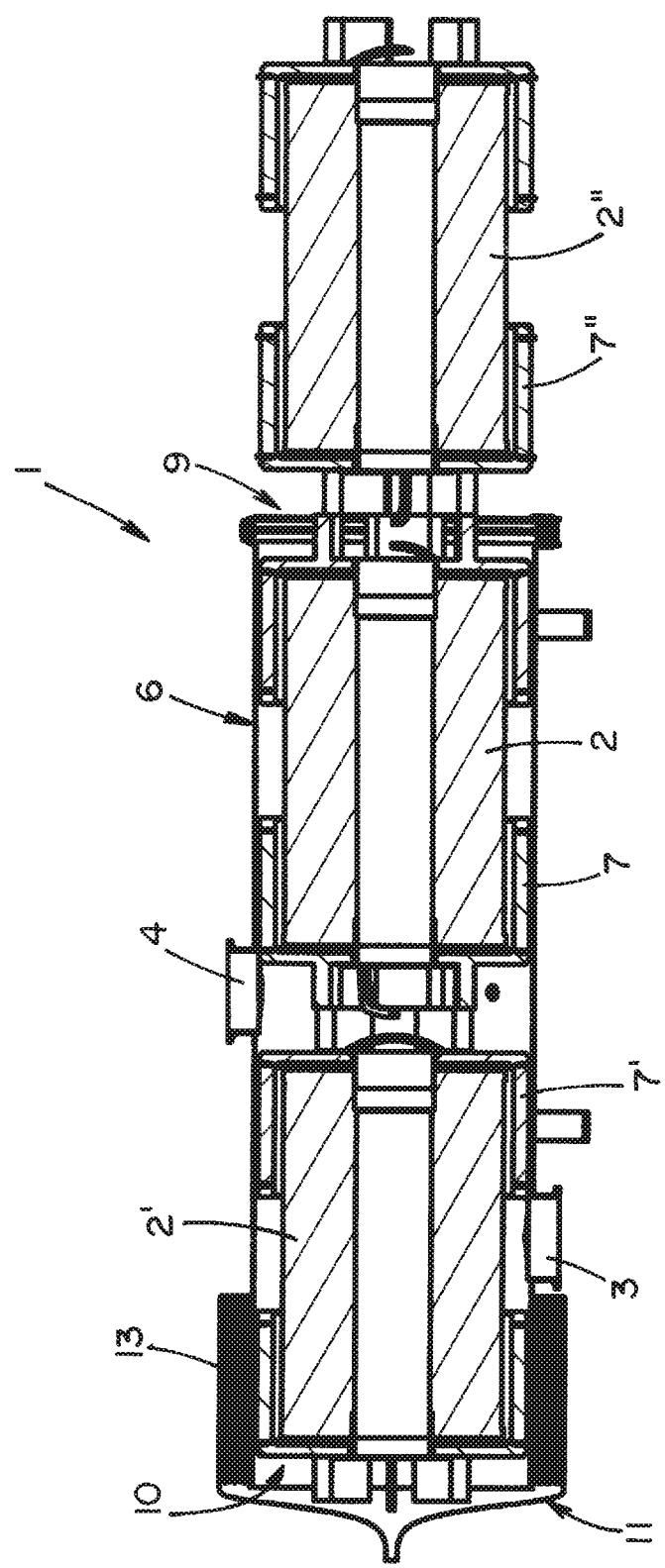

In FIG. 4, a replacement filter body 7" is shown. The replacement filter body 7" is to replace one of the inserted filters (7, 7'). To do this, the following procedure is followed: First, a filter insertion opening 9 on housing 6 is opened by removing a locking device 14. The opened condition is shown in FIG. 4; the closed condition is shown in FIG. 3. The replacement filter body 7" with the new unused HEPA filter 2" will be pushed into the housing 6 of the apparatus 1 from the side, as shown in FIG. 4. This succeeds since replacement filters (7" and 2") and the inserted filters (7, 2; 7', 2') are structurally identical, especially with regard to their geometric dimensions.

As a result of pushing in the replacement filter 7" along the axis of symmetry x (in accordance with FIGS. 3, 4, 5, and 6 toward the "left"), the inserted filters 7, 7' in the housing 6 will be slid along the direction of the axis of symmetry (likewise to the left). Whichever filter is closest to the filter disposal opening 10 (filter 7') will be pushed out of the housing 6 and winds up from there in a segment 12 of the tubing 11.

Figure 5:
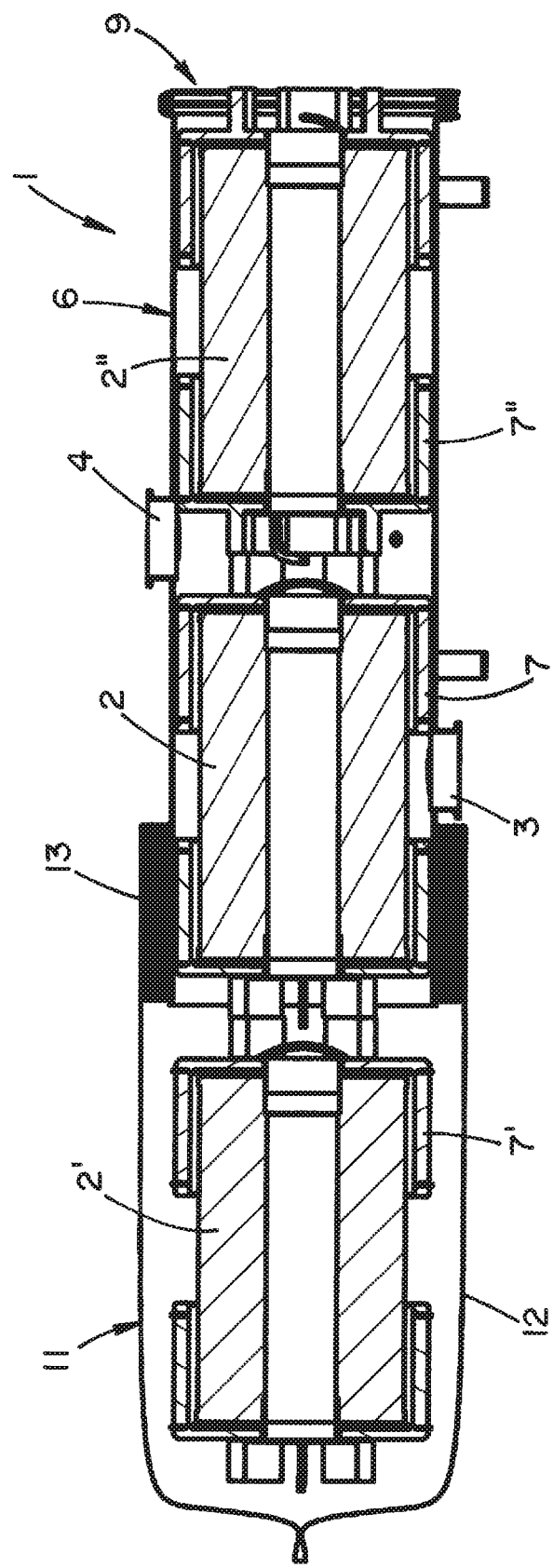

This condition is shown in FIG. 5. The filter body 7' with filter 2' was pushed out of housing 6. Filter body 7 with filter 2 assumes the original position of the filter body 7' with filter 2'. The replacement filter body 7" with filter 2" now sits at the original position of the filter body 7 with the filter 2. The exchanged or rather removed filter 7', 2' is packaged in the tubing section 12 of the tubing. The tubing 11 is stockpiled on the housing 6 to the extent that a tubing stockpile is positioned on the outside of the housing. A tubing section 12 can be removed from the tubing stockpile 13 every time a filter is changed.

Figure 6:
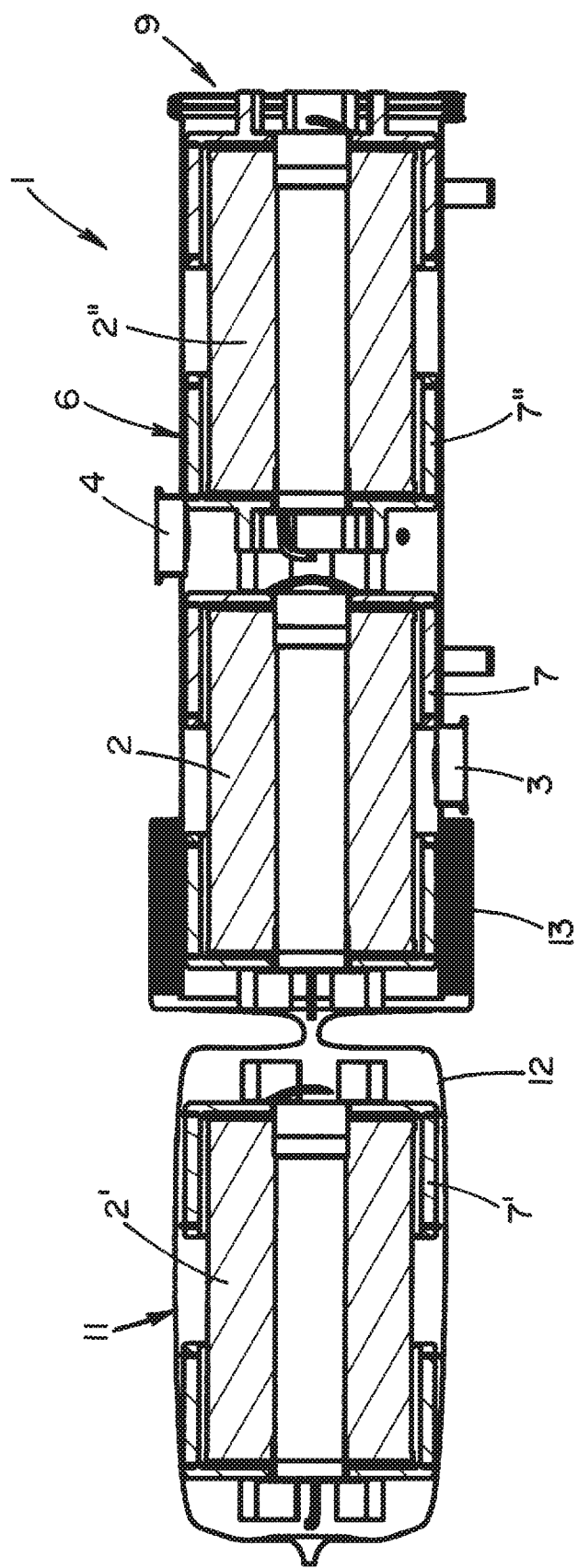

By lacing up or tying off a locked tubing section 12, it can be removed from FIG. 6. The tubing section 12 can be separated from the tube 11 with a suitable release agent (knife, scissors, hot-wire). The removed and usually soiled filter 2' in the filter body 7' can now be safely disposed of, without having the particles collected in the filter 2', 7' getting into the surroundings of apparatus 1.

Should the filter class of the HEPA filters (2, 2', 2") be changed (Class 12 instead of Class 14, for example), it would be necessary to hold two replacement filters 2" with the new HEPA Class at the ready and to carry out the procedure described above twice, each time with the new filter class.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An operating and changing apparatus for a filter body positioned at a filter position, the operating and changing apparatus comprises a housing and a filter body, the operating and changing apparatus having a filter body axis of symmetry and in which at least one particle filter designed to remove particles from a particle-laden fluid is integrated;
   whereby the filter body includes at least one fluid-permeable filter body opening and includes at least one impermeable filter body wall section;
   whereby the housing permeable by the fluid and otherwise impermeable with a flow channel in which the filter body can be so positioned that the at least one particle filter can be permeated by the fluid;
   whereby the flow channel in the housing has at least one flow inlet for an inflow of the particle-laden fluid and has at least one flow outlet for an outflow of a particle-free fluid and are so arranged that the fluid flow between the flow inlet and the flow outlet in the flow channel passes through the at least one particle filter of the at least one filter body,
   the flow channel preferably comprises a channel symmetrical axis that runs collinear or parallel with the filter body axis of symmetry,
   the flow inlet and the flow outlet are positioned offset from each other and/or with a distance between each other, preferably with respect to the channel symmetrical axis,
   the flow channel and the housing include a filter insertion opening and a filter disposal opening, whereby, preferably, the filter insertion opening and the filter disposal opening are positioned along the channel symmetrical axis in geometric alignment,
   that a change of the at least one particle filter through exchange of the filter body takes place against a replacement filter body having a replacement particle filter,
   whereby the replacement filter body can be pushed through the filter insertion opening in the flow channel,
   whereby the filter body to being replaced can be pushed, through the insertion of the replacement filter body, out of the flow channel through the filter disposal opening, and
   whereby during the insertion/pressing out of the filter body, a sliding of the filter body along the channel symmetrical axis aligns the impermeable filter body wall section of the filter body with at least one of the flow inlet and the flow outlet thereby blocking the fluid flow between the flow inlet and the flow outlet long enough for the replacement filter body to reach the filter position so that during the exchange of the at least one particle filter, the flow channel is closed automatically based on the movement of the filter body alone and so that the exchange of the at least one particle filter takes place with a minimal effect on the flow.

2. An operating and changing apparatus for filter bodies, the operating and changing apparatus for filter bodies comprising a filter housing and filter bodies,
   whereby the filter bodies preferably comprise a common dimension and/or filter body axis of symmetry oriented in the longitudinal direction,
   whereby in every filter body of the filter bodies, a particle filter is integrated in each case to remove particles from a particle-laden fluid,
   whereby the every filter body further includes at least one filter body opening permeable by the fluid and includes at least one filter body wall segment impermeable to the fluid,
   whereby the housing can be traversed by the fluid with a flow channel, the filter bodies including a first filter body with a first particle filter and the filter bodies including a second filter body, preferably identical in construction to the first filter body, with a second particle filter, preferably identical to the first particle filter, can be so arranged that the first particle filter and/or the second particle filter can be traversed by the fluid,
   whereby the flow channel in the housing has at least one flow inlet for the inflow of the particle-laden fluid and has at least one flow outlet for an outflow of a particle-free fluid is positioned so that the fluid flow between the flow inlet and the flow outlet in the flow channel passes through the second particle filter of the second filter body,
   the flow channel preferably comprises a channel symmetrical axis that runs collinear or parallel with the filter body's axis of symmetry,
   the flow inlet and the flow outlet can be arranged offset to one another with respect to the channel symmetrical axis,
   the flow channel and the housing in the area of the inlet side include a filter insertion opening and in the area of the outlet side, include a filter disposal opening, whereby, preferably, the filter insertion opening and the filter disposal opening are positioned along the channel symmetrical axis in geometric alignment,
   a particle filter exchange takes place by pushing in a replacement filter body with a replacement filter into the flow channel,
   whereby the replacement filter body can be pushed through the filter insertion opening in the flow channel,
   whereby the first filter body can be pushed by the insertion of the replacement filter body to the original position of the second filter body, while through sliding of the first filter body, the second filter body with the particle filter to be replaced can also be slid, whereby through the insertion of the replacement filter body and the sliding of the first filter body, the second filter body with the particle filter to be replaced can be pushed out of the flow channel through the filter disposal opening, whereby the first filter body after the filter change assumes the position of the second filter body in the flow channel, whereby during the insertion/pressing out of the second filter body, the sliding of the first filter body along the channel symmetrical axis aligns the impermeable filter body wall section of the filter body with at least one of the flow inlet and the flow outlet thereby blocking the fluid flow between the flow inlet and the flow outlet at least long enough for the first filter body to assume the original filter position of the second filter body and the replacement filter body has assumed the original position of the first filter body, so that for the change of the particle filter, the flow channel is closed automatically based on the movement of the filter bodies alone and so that the change of the particle filter takes place with a minimal effect on the flow.

3. The operating and changing apparatus in accordance with claim 2, whereby between the flow channel and the filter bodies, one or more sealing portions, especially seals, are positioned.

4. The operating and changing apparatus in accordance with claim 2, whereby a tubing stockpile arranged on the outside of the housing in the area of the filter disposal opening with which the filter body needing the particle filter to be replaced can be placed in one of the removable tube sections taken from the tubing stockpile mounted on the housing, whereby a tube-like film is positioned on the tubing stockpile.

5. The operating and changing apparatus in accordance with claim 4, whereby the tube section can be sealed with the pushed out filter body inside.

6. The operating and changing apparatus in accordance with claim 2, whereby at least one sealing device to seal at least one of the filter insertion opening and the filter disposal opening.

7. The operating and changing apparatus in accordance with claim 2, whereby at least one safety device built as at least one of a charging device and a travel stop in order to avoid operating errors on the operating and changing apparatus.

8. A conveyor to advance a product by means of a flow of fluid in a conveyor channel for which the fluid stream flows through a filtering device with at least one filter body, the conveyor having the operating and changing apparatus for the filter body according to claim 2.

9. The conveyor in accordance with claim 8, whereby the filter body has a body geometry so that it will fit into the operating and changing apparatus.

10. A conveyor to advance a product by means of a flow of fluid in a conveyor channel for which the fluid stream flows through a filtering device with at least one filter body, the conveyor having the operating and changing apparatus for the filter body according to claim 1.

11. The conveyor in accordance with claim 10, whereby the filter body has a body geometry so that it will fit into the operating and changing apparatus.

* * * * *